United States Patent [19]

Skorup

[11] 3,812,384

[45] May 21, 1974

[54] SET-RESET FLIP-FLOP

[75] Inventor: Gordon Edward Skorup, Marlton, N.J.

[73] Assignee: RCA Corporation, New York, N.Y.

[22] Filed: May 17, 1973

[21] Appl. No.: 361,304

[52] U.S. Cl. .................. 307/238, 307/214, 307/237, 307/251, 307/269, 307/279, 307/291

[51] Int. Cl.... H03k 3/286, H03k 3/33, H03k 17/22

[58] Field of Search ........... 307/237, 239, 240, 241, 307/242, 238, 254, 255, 221 C, 251, 269, 279, 304, 214, 288, 291; 328/72, 73, 95, 96, 97, 99, 100, 195, 196

[56] References Cited

UNITED STATES PATENTS

| | | | |
|---|---|---|---|
| 3,720,841 | 3/1973 | Suzuki | 307/251 X |
| 3,610,964 | 10/1971 | Hatano et al. | 307/269 X |
| 3,739,193 | 6/1973 | Pryor | 307/251 X |
| 3,564,290 | 2/1971 | Sonoda | 307/251 |
| 3,573,498 | 4/1971 | Ahrons | 307/251 X |
| 3,578,984 | 5/1971 | Ryley | 307/279 |
| 3,624,423 | 11/1971 | Borgini | 307/279 |
| 3,676,702 | 7/1972 | McGrogan, Jr. | 307/251 X |

FOREIGN PATENTS OR APPLICATIONS

| | | | |
|---|---|---|---|
| 791,290 | 7/1968 | Canada | 307/279 |

OTHER PUBLICATIONS

Chin et al., "Complementary Mos Set/Reset Latch"; IBM Tech. Discl. Bull., Vol. 15, No. 9; 2/1973

Lohman, "Applications of Mos Fets in Microelectronics"; SCP and Solid State Technology, 3/1966.

*Primary Examiner*—Rudolph V. Rolinec
*Assistant Examiner*—L. N. Anagnos
*Attorney, Agent, or Firm*—H. Christofferson; Henry I. Schanzer

[57] ABSTRACT

A circuit for setting and resetting a bistable circuit includes first and second transistors directly connected to the input of the bistable circuit for selectively clamping the input to a first or a second voltage level for setting the bistable circuit to one state or resetting it to the other state. In a bistable circuit comprised of a master flip-flop coupled to a slave flip-flop by a transmission fate, the set-reset circuit includes first and second transistors directly connected to the input of the master and also includes means for enabling said transmission gate concurrently with the torn on of said first or second transistors for transferring the output of the master to the slave.

5 Claims, 2 Drawing Figures

SET-RESET FLIP-FLOP

Figures 1, 2:
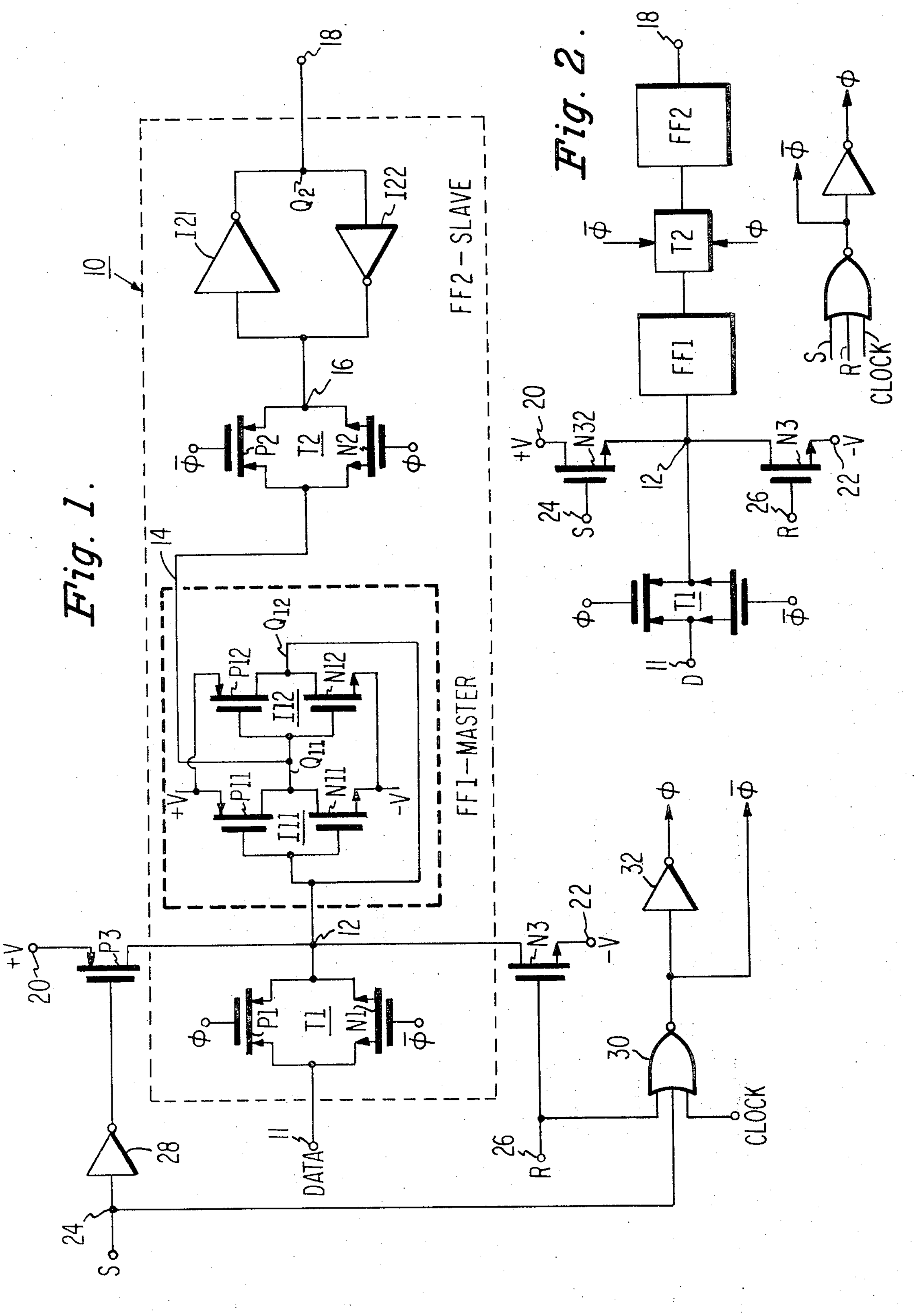

This invention relates to logic circuits and more particularly to set-reset networks for data storage circuits.

In many applications it is desirable and/or necessary to be able to selectively set or reset a data storage circuit to a desired or predetermined condition. Many prior art circuits use set-reset circuitry in the design of data storage circuits. Since a major aim in the design of circuits generally, and integrated circuits specifically, is the efficient utilization of the silicon chip area, optimal usage of the available silicon chip area requires the design of circuits using fewer components per function.

It is a feature of the invention that set-reset networks embodying the invention require very few components and consume very little power.

A set-reset circuit embodying the invention includes a first transistor directly connected to the input of a data storage device for clamping the input to a first voltage level to set the data storage device to a first storage condition and a second transistor directly connected to said input for clamping the input to a second voltage level to set said data storage device to a second storage condition.

In the accompanying drawings like reference characters denote like components, and FIG. 1 is a combination schematic and block diagram of a circuit embodying the invention; and FIG. 2 is a diagram of another circuit embodying the invention.

FIG. 1 illustrates a set-reset master-slave flip-flop embodying the invention. The master-slave bistable circuit 10 includes transmission gates T1 and T2 and two flip-flops (FF1 and FF2). Transmission gate T1 is connected between data input point 11 and node 12 to which the input of FF1 (the master) is connected. The output (Q11) of FF1 is connected via line 14 to one end of transmission gate T2 and the other end of gate T2 is connected to node 16 to which in input of FF2 (the slave) is connected. The output of FF2 (Q2) is connected to output terminal 18.

The circuitry illustrated in FIG. 1 is implemented with insulated-gate field-effect transistors (IGFETS) of complementary conductivity type. IGFETS of P-conductivity type are denoted by the letter P followed by a numerical character and IGFETS of N-conductivity type are denoted by the letter N followed by a numerical character.

Each transmission gate is comprised of a P-conductivity type IGFET having its source-drain path connected in parallel with the source-drain path of an N-conductivity type IGFET.

Inverters I21 and I22 shown in block form may be identical to inverters I11 and I12, respectively, shown in schematic form. Each flip-flop, as illustrated for FF1, includes two cross-coupled complementary inverters. Each inverter includes a P-type transistor (e.g., P11, P12) connected at its source to a point of positive operating potential (+V volts) and at its drain to an output point (e.g., Q11, Q12) and an N-type transistor (e.g., N11, N12) connected at its drain to an output point and at its source to a point of negative operating potential (−V volts). The gates of the two transistors forming an inverter are connected in common. The output (e.g., Q11) of the first inverter of each flip-flop (e.g. I11) is connected to the input of the second inverter of that flip-flop (e.g., I12) and the output of the second inverter of that flip-flop is fed back to the input of the first inverter.

The circuitry to set or reset the bistable circuit 10 includes a set input terminal 24 adapted to receive a set signal and a reset input terminal 26 adapted to receive a reset signal. The set input is connected to the input of inverter 28 and to one input of NOR gate 30. The output of inverter 28 is connected to the gate electrode of transistor P3. The source-drain path of transistor P3 is connected between node 12 and terminal 20 to which is applied +V volts. The reset input is connected to the gate electrode of transistor N3 and to one input of NOR gate 30. The source-drain path of transistor N3 is connected between node 12 and a terminal 22 to which is applied −V volts.

A source (not shown) of clock signals is applied to the third input of NOR gate 30. The clock signal may be an asymmetrical or a symmetrical signal and may vary over a wide range of frequencies. The output of gate 30 denoted $\overline{\phi}$, is applied to the gate electrodes of transistors N1 and P2 and to the input of inverter 32. The output of inverter 32 is applied to the gate electrodes of transistors P1 and N2. The signals $\phi$ and $\overline{\phi}$ as well as all other input signals applied to the system vary in amplitude between +V volts and −V volts.

In the discussion to follow it will be convenient to discuss operation in Boolean terms. The convention arbitrarily adopted is that the most positive voltage used in the system represents the binary digit "1" also called "high" or "hi" and that the least positive voltage represents the binary digit "0" also referred to as "low" or "lo."

Transmission gate T1 is turned on when the signal $\overline{\phi}$ is high ($\phi$ low) and transmission gate T2 is turned on when the signal $\phi$ is high ($\overline{\phi}$ low). In the circuit of FIG. 1 $\phi$ and $\overline{\phi}$ are complementary signals, that is, when $\phi$ is high, $\overline{\phi}$ is low and vice versa. In general, however, for the proper operation of the circuit of FIG. 1 transmission gate T1 could be operated by a signal $\phi$1 and $\overline{\phi}$1 and transmission gate T2 could be operated by a signal $\phi$2 and $\overline{\phi}$2. The relationship between $\phi$1 and $\phi$2 would be such that during the counting operation transmission gates T1 and T2 may both be off at the same time but only one of the two can be on at any one time.

The set and reset input signals to the flip-flop and to NOR gate 30 are normally low (S=R=O). For this signal condition (S=R=O) transistors P3 and N3 are turned off and NOR gate 30 functions as an inverter of the clock signal, i.e., when the clock signal is high, $\overline{\phi}$ is low and $\phi$ is high and vice versa when the clock is low, $\overline{\phi}$ is high and $\phi$ is low.

The operation of the master-slave flip-flop for the condition S=R=O is as follows. When $\overline{\phi}$ is high ($\phi$ low) transmission gate T1 is enabled and the data input present at terminal 11 is transferred to node 12. Inverter I11 produces at its output a signal Q11 which is the inverse of the signal present at node 12. The output of inverter I11 is applied to the input of inverter I12 and via line 14 to the input of transmission gate T2. Inverter I12 provides regenerative feed back between the output and the input of inverter I11 causing the flip-flop to latch. In response to a high signal applied to node 12, Q11 goes low and Q12 goes high and in response to a low signal at node 12, Q11 goes high and Q12 goes low.

So long as $\bar{\phi}$ is high ($\phi$ is low) gate T1 is on and gate T2 is cut off. When $\phi$ goes high, $\bar{\phi}$ goes low and gate T2 is turned on. The output (Q11) of the master flip-flop is then coupled through the low impedance conduction path of transmission gate T2 to the input 16 of the slave flip-flop. Inverter I21 then produces at terminal 18 an output Q2, which is the inverse of Q11. Inverter I22 (like I12) provides positive feedback from the output to the input of inverter I21 causing FF2 to latch. The output Q2 of FF2 is set, when $\phi$ goes high, to the binary condition of the input signal present at terminal 11 when $\bar{\phi}$ was high and gate T1 was enabled. Thus, in normal operation, information is transferred from the data input to the master during one phase of the clock signal and the information present in the master is transferred to the slave during a second, succeeding, phase of the clock signal.

When the set input goes high (S=1) the output of inverter 28 goes "low." This turns on transistor P3 which clamps node 12 to +V volts. Thus +V volts is applied to the input of FF1 causing Q11 to go low. Concurrently, for S=1, the output ($\bar{\phi}$) of gate 30 goes "low" turning off transmission gate T1. Transmission gate T1 being turned off prevents signals other than the set signal from being applied to the input of FF1. However, the output ($\phi$) of inverter 32 goes high, turning on transmission gate T2. The output (Q11) of FF1, set to the low level by S=1, is thus passed along line 14 and through gate T2 to the input 16 of FF2, which causes Q2 to go high. The set input signal S=1 is thus immediately transferred from node 12 to the output terminal 18 upon the application of the set command.

When the reset input goes high (R=1) transistor N3 is turned on and node 12 is clamped to −V volts. The high reset signal causes the output ($\bar{\phi}$) of gate 30 to go low and the output ($\phi$) of inverter 32 to go high. This turns off gate T1 and turns on gate T2. The turn off of gate T1 prevents any signal other than the reset signal from being coupled into the FF1 and ensures that the input to node 12 of FF1 is a low level. This low level causes he output (Q11) of FF1 to go high. Since gate T2 is "on," the high at the output of the FF1 is transferred immediately to the input of FF2 and causes the output (Q2) of FF2 to go low. Thus, immediately upon the application of the reset input, R=1, the output Q2 of FF2 is forced to the low level.

The use of the set and reset inputs to control NOR gate 30 ensures that the master-slave flip-flop can be set or reset asynchronously. When either of the set and reset inputs is high it controls the output of gates 30 and 32 regardless of the state of the clock. That is, whenever a set or a reset signal is present (S or R=1) $\bar{\phi}$ is low and $\phi$ is high, and gate T2 is enabled and gate T1 is cut off. Therefore, whenever S or R=1 the information corresponding to S or R=1 ripples through the flip-flop.

The circuit of FIG. 2 illustrates that inverter 28 and transistor P3 shown in FIG. 1 may be replaced by a single transistor. Transistor N32 is connected at its drain to terminal 20, at its source to node 12 and at its gate electrode to set input terminal 24. In response to a high signal at terminal 24 transistor N32 is turned on and operates in the source-follower mode. If the threshold voltage ($V_T$) of transistor N32 is relatively low, substantially the fully +V potential is applied to node 12 when transistor N32 is turned on. When the signal at terminal 24 is low, transistor N32 is biased off. The operation of the rest of the circuit is similar to that described for FIG. 1 above and need not be detailed.

In an actual circuit embodying the invention, the transistors forming inverters I12 and I22 were designed to have substantially higher impedances than the transistors forming inverters I11 and I21. For example, for the same bias condition, the source-drain paths of transistors P12 and N12 have an impedance which is between three and 10 times greater than the impedance of the source-drain paths of transistors P11 and N11. Also, the "on" impedance of transistors P12 and N12 is much greater than the "on" impedance of transistors P1 and N1 forming transmission gate T1. Therefore, transistors P12 and N12 do not "load down" the signal present at terminal 11 and applied at node 12 by means of gate T1.

It should be appreciated that the use of complementary transistors, though preferable for power minimization is only by way of example. Also, the transmission gates and the flip-flop illustrated in FIG. 1 are by way of example only and any other means for performing the same function could be used instead. For example, any flip-flop which can be set or reset by the set-reset clamp circuit embodying the invention may be used instead of the flip-flops shown, and the transmission gates may be replaced by other signal coupling means.

What is claimed is:

1. In combination with first and second storage devices each having an input and an output and having coupling means for selectively transferring the output of the first device to the input of the second device, a set-reset circuit comprising:

first and second points of operating potential;

a first transistor directly connected between said first point and said input of said first device;

a second transistor directly connected between said second point and said input of said first device;

means for selectively enabling one of said first and second transistors for switching said first device to either a first or a second storage condition, respectively; and means for enabling said coupling means concurrently with the enabling of said first or second transistors for transferring the ouput of said first device to the input of said second device.

2. In the set-reset circuit as claimed in claim 1 wherein said first and second transistors are insulated-gate field-effect transistors;

wherein said first transistor is of one conductivity type and said second transistor is of complementary conductivity type; and wherein said coupling means is a transmission gate means comprising first and second insulated-gate field-effect transistors of first and second conductivity type, respectively.

3. In the set-reset circuit as claimed in claim 1 wherein said first and second transistors are of the same conductivity type; and wherein said coupling means is a transmission gate means.

4. The combination comprising:

a data input point;

first and second transmission gates;

first and second data storage devices, each device having an input and an output;

means connecting said first transmission gate between said data input point and the input of said first device;

means connecting said second transmission gate between the output of said first device and the input of said second device;

first and second points for the application thereto of first and second operating potentials, respectively;

first and second transistors directly connected between the input of said first device and said first and second points, respectively;

means coupled to said first and second transistors for selectively turning on one of said first and second transistors for setting said first device to one of first and second storage conditions, respectively; and means for enabling said second transmission gate and disabling said first transmission gate, concurrently with the turn on of one of said first and second transistors.

5. The combination comprising:

a data input point;

first and second transmission gates;

first and second data storage devices, each device having an input and an output;

means connecting said first transmission gate between said data input point and the input of said first device;

means connecting said second transmission gate between the output of said first device and the input of said second device;

first and second points for the application thereto of first and second operating potentials, respectively;

a set input terminal, a reset input terminal and a clock input terminal for the application thereto of set, reset, and clock signals, respectively;

first and second transistors directly connected between the input of said first device and said first and second points, respectively;

means coupling said set terminal to said first transistor for setting said first device to a first storage condition in response to a set signal;

means coupling said reset terminal to said second transistor for setting said first device to a second storage condition in response to a reset signal; and gating means coupled between said set, reset, and clock terminals and said first and second transmission gates for enabling said first transmission gate during a first time interval and then enabling said second transmission gate during a succeeding time interval in the absence of set and reset signals, and responsive to the presence of one of said set and reset signals for disabling said first transmission gate and enabling said second transmission gate.

* * * * *